United States Patent [19]

Moore

[11] Patent Number: 5,428,765

[45] Date of Patent: Jun. 27, 1995

[54] METHOD AND APPARATUS FOR DISABLING AND RESTARTING CLOCKS

[75] Inventor: Terrill M. Moore, Trumansburg, N.Y.

[73] Assignee: Databook Incorporated, Ithaca, N.Y.

[21] Appl. No.: 106,033

[22] Filed: Aug. 12, 1993

[51] Int. Cl.⁶ .................... H03K 5/13; G01R 19/00
[52] U.S. Cl. .................... 395/550; 364/483; 364/DIG. 1; 370/85.1; 327/142; 327/292
[58] Field of Search ............... 364/483, 900, DIG. 1, 364/DIG. 2; 307/259, 272.2; 370/85.1; 395/550

[56] References Cited

U.S. PATENT DOCUMENTS

| | | | |
|---|---|---|---|
| 4,545,030 | 10/1985 | Kitchin | 364/900 |
| 4,800,296 | 1/1989 | Ovens et al. | 307/291 |
| 4,893,271 | 1/1990 | Davis et al. | 364/900 |
| 4,970,407 | 11/1990 | Patchen | 307/972.2 |
| 4,980,836 | 12/1990 | Carter et al. | 364/483 |
| 5,034,624 | 7/1991 | Flaherty et al. | 307/269 |
| 5,086,427 | 2/1992 | Whittaker et al. | 370/85.1 |

OTHER PUBLICATIONS

Wakerly, John, "Designer's Guide to Synchronizers and Metastability Part I", Sep., 1987, pp. 4-8.
Wakerly, John, "Designer's Guide to Synchronizers and Metastability Part 2", Oct., 1987, pp. 4-8.

Primary Examiner—Kevin A. Kriess
Assistant Examiner—Majid A. Banankhah
Attorney, Agent, or Firm—Nixon, Hargrave, Devans & Doyle

[57] ABSTRACT

The ability to stop a clock in a CMOS peripheral device or other CMOS IC, and reliably restart it based on an asynchronous event, provides the basis for considerable power savings. In a computer system 20 an interface component 10 has a clock restart circuit 100. The restart circuit 100 includes a series of D-type CMOS flip-flops (110, 112, 118) that are initially set in their zero state. A logic OR gate 120 receives the microprocessor clock and the complimentary output of the last flip-flop to provide a reliable, restarted clock signal for the interface component 10 and its peripherals 26.

26 Claims, 5 Drawing Sheets

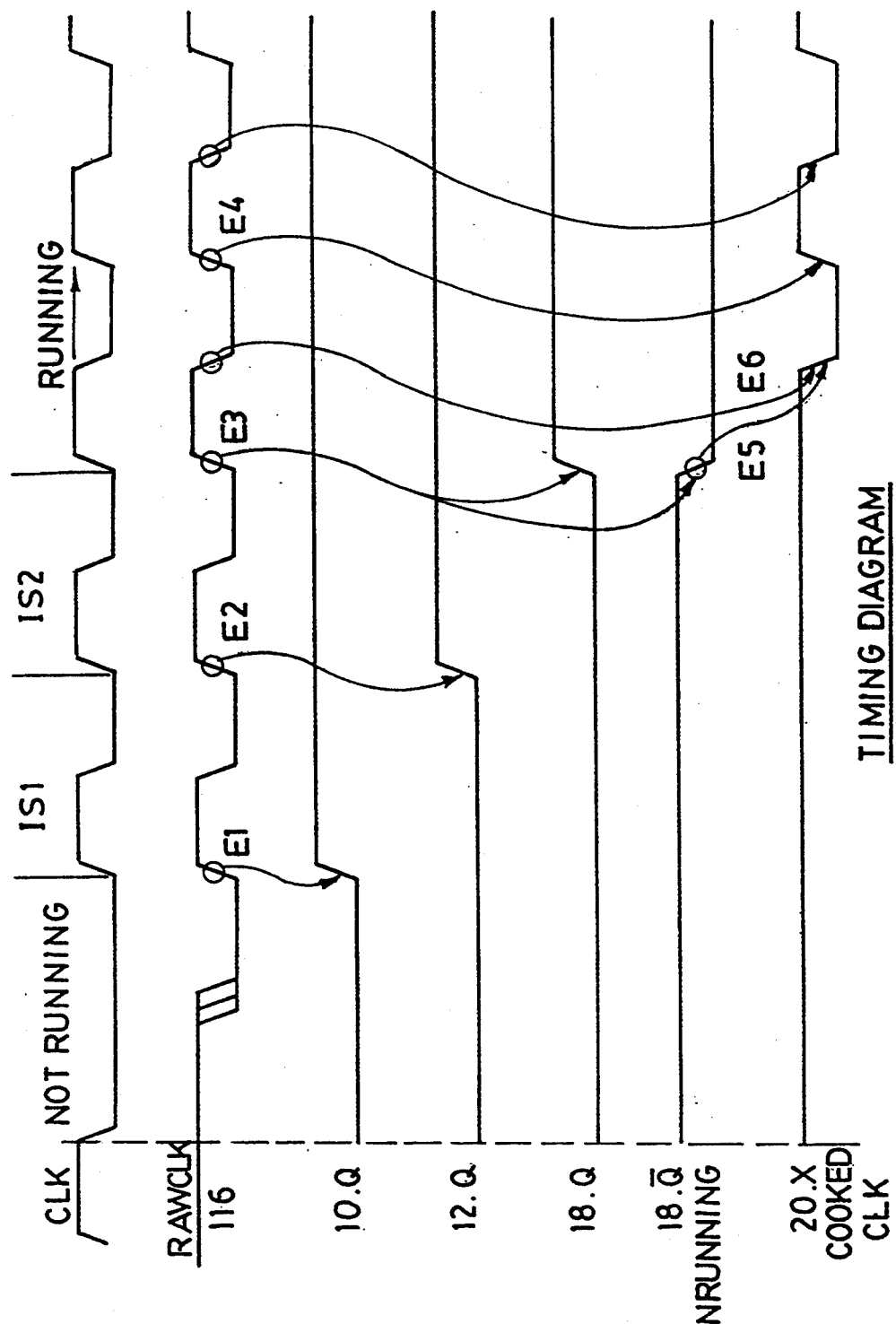

METHOD AND APPARATUS FOR DISABLING AND RESTARTING CLOCKS

This invention relates in general to a method and apparatus for providing a reliable clock in an electronic system and, in particular, to a method and apparatus for disabling and restarting a clock in an interface device disposed between a microprocessor and a peripheral port, or in any device requiring an internal clock for synchronous operation which is able to retain full state information with the clock stopped.

BACKGROUND

With advances in microelectronic technology, many computer systems have shrunk to the size where they can be operated by batteries. In order to extend the life of such battery driven systems, it is often necessary to conserve power consumed by the components that comprise the system. In an effort to conserve power, designers have attempted to use low power systems and to turn off subsystems when they are not required. With low-power CMOS circuits, turning off the clock to a circuit will frequently reduce the power consumed by that circuit by several orders of magnitude.

With computer designs where subsystems are turned off, there is an inherent problem with restarting such subsystems. Computer systems generally operate from a common clock. So, all of the activities of the system occur on the change of state of the clock.

When the clock in a subsystem is disabled, it is a requirement that the subsystem be presented a reliable and stable clock signal internally when said clock is reenabled. In general, an event triggering the reenabling of the clock is asynchronous to the clock. A problem arises if the subsystem is reenabled at or about the same time as the system clock is changing state. It is well known that microelectronic components, in particular the D-type flip-flops which are common in microelectronic systems, can be driven into a metastable state if a narrow clock pulse is applied to such D-type flip-flops. It is highly desirable to avoid such occurrences since an unstable clock signal introduced into a subsystem could have a ripple effect throughout the subsystem causing the subsystem to fail and perhaps the entire computer system to fail.

Accordingly, it is an object of this invention to provide a stable and reliable internal clock signal within a component under all operating conditions, while not requiring any clock whatsoever when the clock is disabled.

It is another object of the invention to provide a stable and reliable clock signal to a component in a computer system when a previously disabled clock signal is restarted asynchronously to the clock.

Prior systems have included the ability to enable a clock going to a subsystem, provided that the clock control circuit was itself always provided with a valid clock. This invention differs by providing a "bootstrapping" method, allowing the clock to be removed from the entire subsystem. In the context of an integrated circuit, this significantly reduces the standby power of the circuit, by allowing the system clock to be disabled at the input pin of the device when the integrated circuit is in a standby mode.

SUMMARY OF THE INVENTION

A method and apparatus are provided that use a series of flip-flops, each with a known, predetermined state. In the preferred embodiment, the flip-flops are D-type flip-flops formulated in CMOS technology. Each of the flip-flops receives an input clock signal. The first flip-flop in the chain also receives a known state signal at its input and that known state signal is opposite to the state of the output of the flip-flops at the beginning of the clock reenabling process. The last flip-flop in the chain has its complimentary output coupled to a logic circuit, preferably an OR circuit. The OR circuit also receives the input clock signal. In effect, the chain of flip-flops, at least two, and preferably three, comprises a shift register. The known input signal to the shift register is serially clocked through the flip-flops by the changing clock signals.

One of the features of this invention is the use of D-type flip-flops, implemented with transmission gates. With such flip-flops, the input signal is clocked to the output upon the rising edge of a clock signal. It is another feature of transmission-gate D-type flip-flops that if the input to the flip-flop is equal to its stored state and a narrow clock pulse occurs, the flip-flop will not change state. That is, such D-type flip-flops are resistant to entering into a metastable state so long as the conditions ensure that the input of the flip-flop is equal to its stored state whenever a narrow clock pulse occurs. By use of a chain of at least two and preferably three flip-flops, the foregoing condition is assured with extremely high probability by the time the signal has propagated to the end of the chain of flip-flops. As such, the circuit and method of the invention provides a known delay between the change of state of the last flip-flop and the change of state in the logic circuit that gates the clock signal to the rest of the subsystem that has been recently turned on, enabling it to operate synchronously to external components at the end of this known time interval.

BRIEF DESCRIPTION OF THE DRAWINGS

FIG. 5 is a timing diagram of the invention.

DETAILED DESCRIPTION

Figure 1:
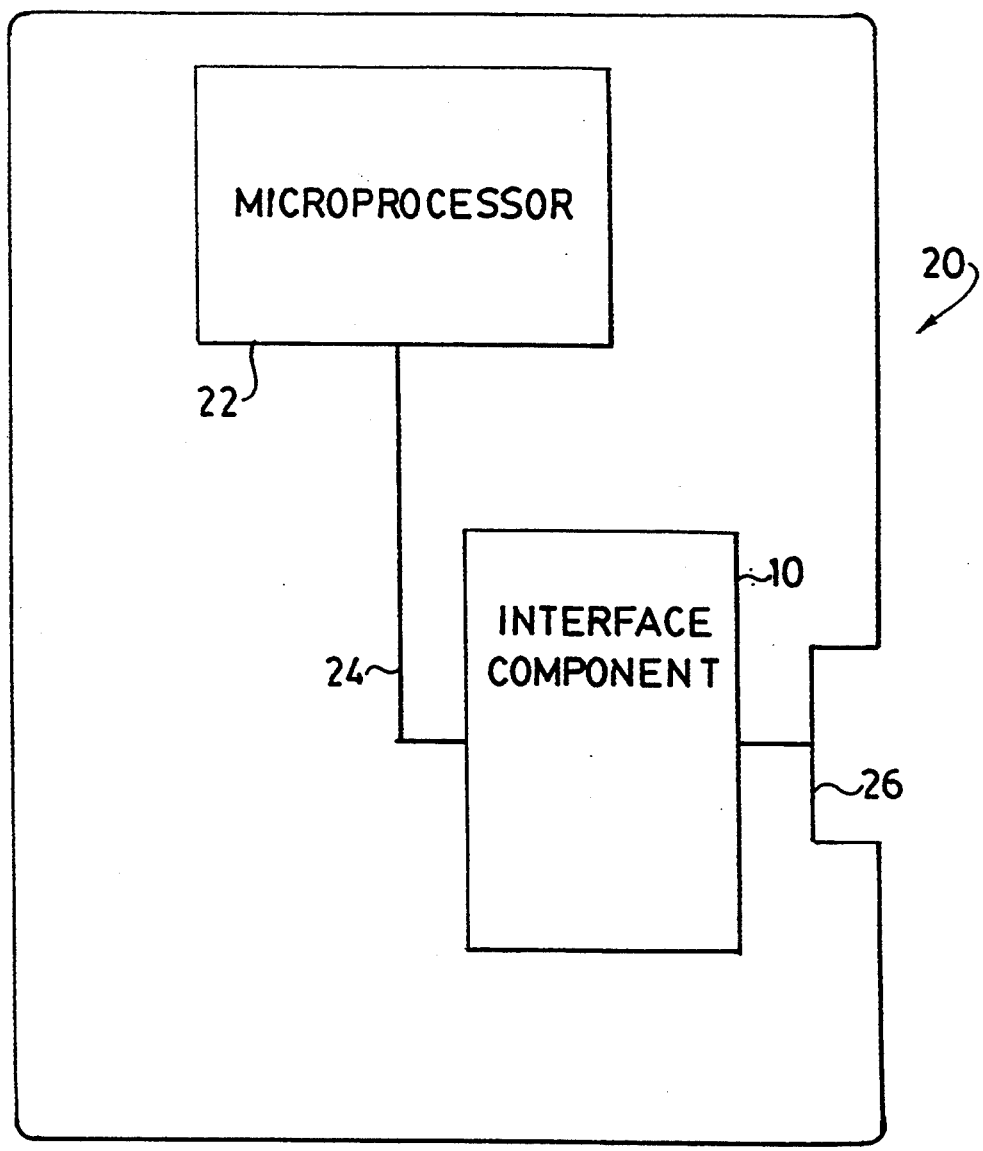
FIG. 1 is a block diagram of a computer system with a microprocessor and a subsystem including the invention.

With reference to FIG. 1, a computer system 20 is shown with a microprocessor 22 that is coupled to a peripheral port 26 via an internal ISA or similar system bus 24 and an interface component 10. The microprocessor 22 may be of any suitable type, examples of which are the Intel 486DX or a CYRIX 486SLC. The bus 24 is a standard ISA or PC/AT bus or other system bus. The system bus 24 carries a clock signal, CLK, to the interface component 10. Interface component 10 is a Databook DB86082 PC Card Controller for Notebook Personal Computers, for use with a system in compliance with PCMCIA standards. In this particular embodiment, the peripheral port 26 also complies with PCMCIA standards and can receive a peripheral device (not shown) such as a modem, flash memory card, fax, or any other suitable memory or input/output device that can be plugged into peripheral port 26.

One of the features of the controller 10 is that it is a totally static design. This allows its clock to be stopped internally or externally without loss of state information stored in its internal registers. Another feature of the controller 10 is its internal hardware logic which automatically disables the internal clock signal after the completion of a read or write cycle, placing the controller 10 in a low-power standby mode with no software intervention. This is achieved by internal gating; the CLK signal can remain active at the clock input pin to the controller 10 during this standby period. A feature of the invention is the reenabling of the internal clock a fixed period of time after an external, asynchronous wakeup event, a chip-select in the case of the DB86082 controller 10.

Figure 2:
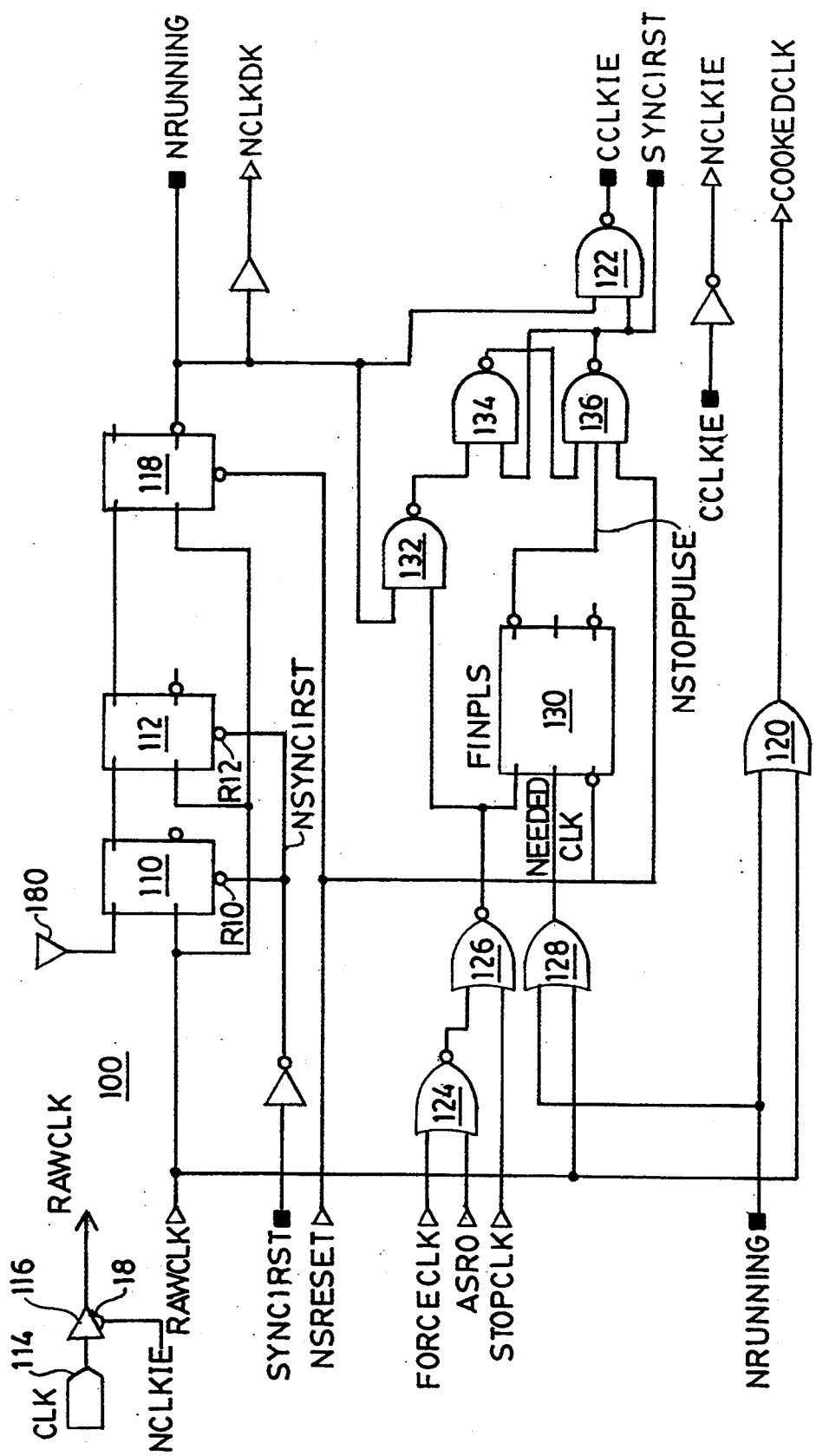
FIG. 2 is a schematic diagram of a circuit in the interface component that receives a clock signal from the microprocessor.

Turning to FIG. 2, there is shown a schematic diagram of the circuit of the invention that is useful for receiving the CLK signal from the microprocessor 22 and controlling whether the clock is passed on to the next stage of the circuitry within interface component 10. The CLK signal from the microprocessor 22 is input to a zero-power input buffer or other such gating device 116 at input line 114. Buffer 116 is controlled by a signal NCLKIE (not clock input enable) on line 18. When signal NCLKIE is active (low in the example circuit), the output signal, RAWCLK, follows the state of the input signal. When signal NCLKIE is inactive (high in the example circuit), RAWCLK is held in a known state regardless of any activity on the input signal CLK at line 114. Buffer 116 is the input buffer for interface component 10 and by driving signal NCLKIE to an inactive state, one can eliminate clock transitions on signal RAWCLK within interface component 10. If buffer 116 is implemented with a zero power buffer, then input transitions on line 114 will cause no power to be dissipated within interface circuit 10, so long as signal NCLKIE is in an inactive state. In the example circuits and diagrams, one assumes that when NCLKIE is inactive, buffer 116 will drive RAWCLK to a logic '1'.

When it is desired to restart the clock inside the interface component 10, it is necessary to change the state of signal NCLKIE to enable the three-state buffer 116 and thereby pass signal RAWCLK to the clock processing circuit 100. However, since no clock is available inside interface component 10, this transition of NCLKIE will necessarily occur asynchronously to the external clock CLK. Therefore, the signal RAWCLK may contain an initial pulse that is arbitrarily short in duration. This pulse may be shorter than the minimum clock period allowed by the circuitry inside component 10, and therefore may cause the circuitry inside interface component 10 to malfunction. The rest of the circuitry shown in FIG. 2 is designed to defend the rest of interface component 10 against such pulses.

Clock processing circuit 100 includes three CMOS transmission-gate D-type flip-flops 110, 112, 118. The RAWCLK signal is coupled to the clock input of each of the flip-flops 110, 112, 118. The Q output of flip-flop 110 is coupled to the D input to flip-flop 112. The Q output of flip-flop 112 is coupled to the D input of flip-flop 118. The complimentary or $\overline{Q}$ output of flip-flop 118 is denominated by a signal NRUNNING (not running). The signal NRUNNING provides one input to OR gate 120. The other input to OR gate 120 is RAWCLK. The output of OR gate 120 is the desired, reliable clock signal denominated COOKEDCLK.

Flip-flop 112 has its D input coupled to a source 180. The source 180 is a fixed signal source that provides a known state to the D input of flip-flop 110. The reset inputs to flip-flops 110, 112, are controlled by a signal SYNC1RST which is inverted prior to the reset input to derive signal NSYNC1RST to both reset inputs of flip-flops 110, 112. The reset input to flip-flop 118 is signal NSRESET. The signal NSRESET is the master reset signal for the controller 10. This signal is processed by pulse processing circuit 130 and logic gates 132, 134, and 136 to provide the SYNC1RST signal for flip-flops 110, 112 reset inputs. The other input signals to circuit 100 include FORCECLK, ASREQ, and STOPCLK. Those signals are likewise processed by logic gates 124, 126, 128 and pulse processing circuit 130 to provide the SYNC1RST signal as well as the cooked clock input enable signal CCLKIE.

Figure 3:
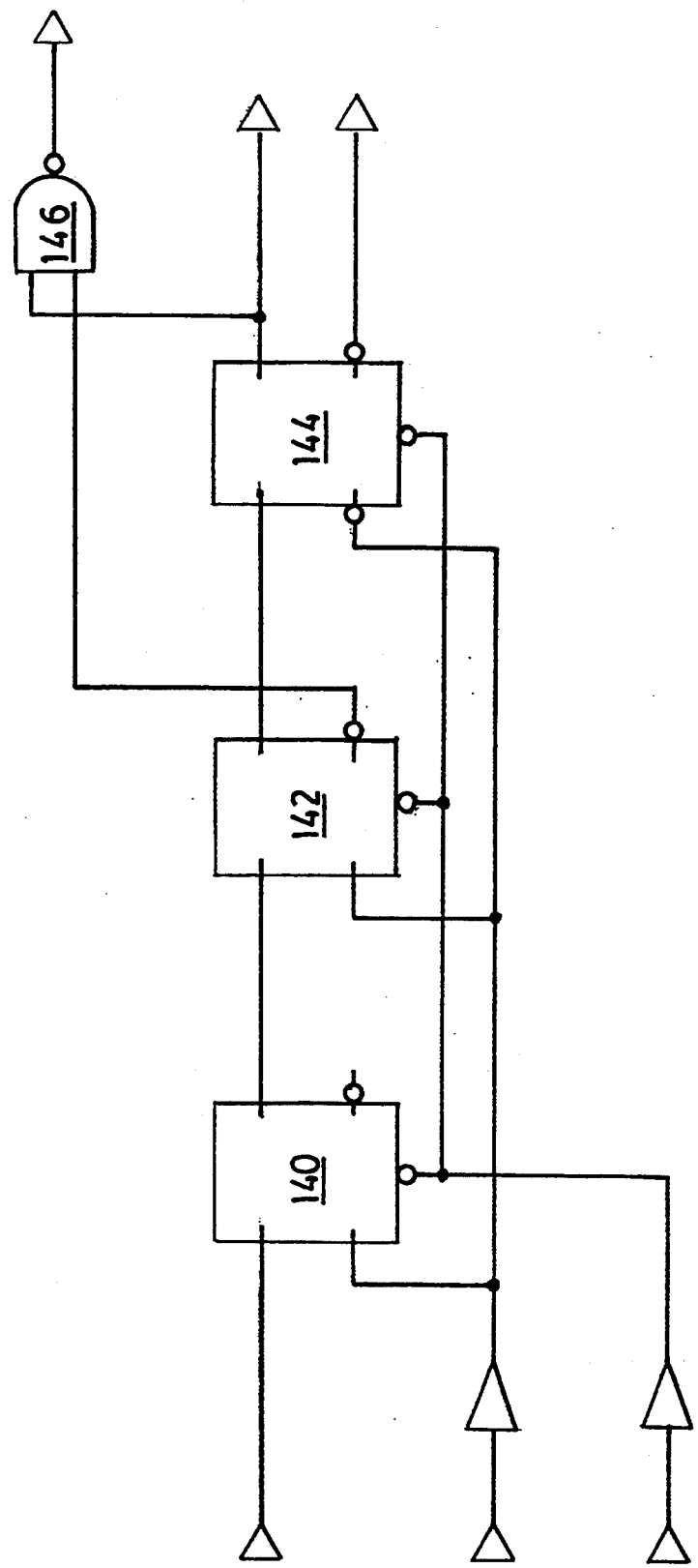
FIG. 3 is a further schematic diagram of a pulse processing circuit 30 of FIG. 3.

The pulse processing circuit 130 is more fully shown in FIG. 3. There, the three inputs to the clock pulse enable circuit 130 are shown coupled through a series of D-type flip-flops 140, 142, 143 and an output AND gate 146 to provide the outputs of pulse processing circuit 130.

Figure 4:
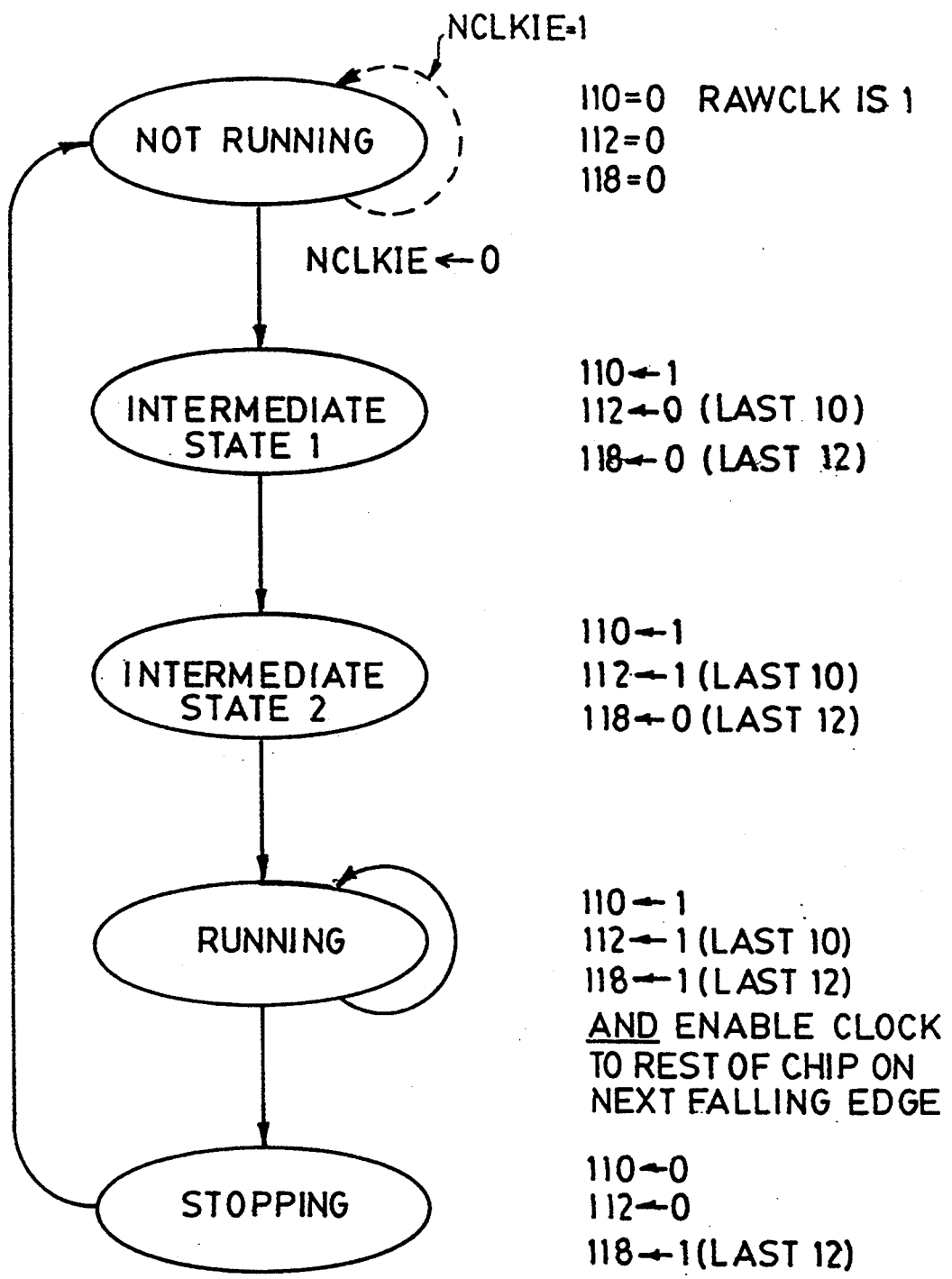
FIG. 4 is a state diagram of the invention.

In order to understand the operation of the circuit 100, the following explanation will refer to FIGS. 2, 4 and 5. The explanation will begin with an assumption that the NRUNNING signal is high, that the Q outputs of D-type flip-flops 110, 112, 118 are all zero and that the D-input 180 to flip-flop 110 is set high or one. With reference to FIG. 5, the circuit 100 will continue to idle in the not running state until the signal NCLKIE on the zero-power input or other gating buffer 116 changes state and connects the clock 114 to the clock input of flip-flop 110 as a RAWCLK signal. The signal NCLKIE is generated asynchronously by other circuitry (not shown) in component 10 in response to a command from microprocessor 22, or in response to other events detected asynchronously on inputs connected to circuitry external to component 10. Logic in component 10 recognize the command from the microprocessor as one directed to component 10 or one of its peripherals 26. At this time, signal CLK may be either high or low. If CLK is high, then RAWCLK 116 stays high until CLK goes low; if CLK is low, then RAWCLK 116 goes low immediately. Upon the occurrence of the next rising edge of the RAWCLK 116, shown as event 1 in FIG. 5, the circuit will enter a first intermediate state, IS 1. Upon such occurrence of the rising edge of RAWCLK 116, the one or high input at the D-input of flip-flop 110 will be clocked to its output. The outputs of flip-flops 112 and 118 will remain at their preset zero state. Upon the occurrence of the next rising edge of RAWCLK 116, the circuit 100 will enter its second intermediate state, IS 2. Upon the occurrence of the second rising edge of RAWCLK 116, the Q-output of flip-flop 110 that is coupled to the D-input of flip-flop 112 will be clocked to the output of flip-flop 112. Flip-flop 118 will remain with its output at zero. On the third rising edge of RAWCLK 116, the circuit 100 will change its state from not running to a running state. When RAWCLK 116 rises for the third time, the Q output of flip-flop 118 changes state from 0 to 1. Likewise, the complimentary output or $\overline{Q}$ output of 118 changes state from 1 to 0. The latter change in state of the complimentary output of flip-flop 118 causes logic circuit OR gate 120 to change its state. When OR gate 120 changes state, its output corresponds to the RAWCLK input signal and is denominated COOKEDCLK.

It will be recalled that during the not running state, D-type flip-flop 118 had its Q-output at zero and so its complimentary or $\overline{Q}$ output was 1. With one input to the OR gate 120 fixed as a 1, the output of the OR gate which is the COOKEDCLK signal, is a steady state output and does not change regardless of the variation of the other input, RAWCLK. However, once the NRUNNING input to OR gate 120 changes state to a zero at event 3, then, following the first falling edge of the RAWCLK 116, the output of 120 will follow the RAWCLK signal 116 and provide the COOKEDCLK signal as shown at event E6 in FIG. 5 and subsequent.

The circuit 100 idles in the running state as shown in FIG. 3 until the microprocessor and/or the PCMCIA interface component 10 determine that it is no longer necessary to use the PCMCIA component 10 and that it is desirable to terminate the clock signal within the component 10. Prior to stopping the clock, the flip-flops 110, 112, 118 are set into known states in a manner well-known in the art. As such, using the NSRESET signal, the Q outputs of flip-flops 110, 112, and 118 will all be placed in the zero state prior to any subsequent stopping of the clock.

Those skilled in the art will appreciate from the above description that circuit 100 is configured so there is approximately a one-half clock period delay between the change of state of the NRUNNING signal and the change of state of the output of OR gate 120. This half cycle delay is a consequence of gating the complementary output $\overline{Q}$ of flip flop 118 which has been set by the third rising edge of RAWCLK to a logic-low level into OR gate 120, while RAWCLK is still at a logic high level. Those skilled in the art will recognize that this delay ensures that the duration of the initial pulse of the COOKEDCLK will match the duration of the corresponding pulse of signal CLK. Were this delay not inserted, the first pulse of the COOKEDCLK would be shorted by the logic propagation times of flip-flop 118 and OR gate 120.

In addition, those skilled in the art will appreciate that D-type flip-flops fabricated with transmission gates, as is the common practice in complimentary metal oxide semiconductor technology, have particular characteristics when they are clocked by narrow pulses, too short to meet the normal requirement for a state transition. When the state of the flip-flop and its D input logic level are the same (both the state and the D input are at one or zero), such flip-flops will not change state upon the occurrence of a partial or narrow clock pulse. Thus, such flip-flops are resistant to being driven into metastability under these conditions. Those skilled in the art will appreciate that the above design and method calls for setting the D-type flip-flops in their known states and then using this characteristic of the flip-flops to guarantee that a reliable, stable clock signal is propagated.

Those skilled in the art will also appreciate that the above design could be implemented with as few as two D-type flip-flops. However, in the preferred embodiment, three flip-flops are chosen so as to ensure an extra measure of design margin. As such, if the first cycle of RAWCLK after the buffer or gating device 116 is enabled is an arbitrarily narrow pulse, the output of the first flip-flop 110 may become metastable. Those skilled in the art will know that such metastable conditions resolve in a random fashion, and that the mean-time-between failures of an asynchronous circuit is an exponential function of the form $Ae^{-kt}$, where t is the metastable resolution period of the system, and A and k depend on the characteristics of the flip-flops and of the input signals and clocks. Therefore, by building in a delay of at least one other flip-flop 112, and preferably two flip-flops by adding flip-flop 118, there is a sufficient amount of time delay to ensure that a narrow clock pulse on the RAWCLK signal will not propagate through as a metastable condition to the cooked clock signal. Hence, if an arbitrarily narrow pulse caused a metastable condition at the Q-output of flip-flop 110, that metastable signal would still have to wait at least another entire clock cycle before being sampled by flip-flop 112.

Those skilled in the art will also appreciate that circuit 100 sets the D-type flip-flops 110, 112, 118 into their zero state before turning off the clock. The latter is accomplished by any one of a number of known techniques that is within the skill of those of the art. In the preferred embodiment, flip-flops 110 and 112 are reset to their zero state, then, that zero state, after one clock cycle, is clocked through to D-type flip-flop 118 thereupon the NCLKIE signal to buffer or gating device 116 is activated to set buffer or gating device 116 into its disconnected state.

Having thus described the preferred embodiment of the invention, those skilled in the art will appreciate that further modifications, changes, alterations, additions and deletions can be made thereto without departing from the spirit and scope of the invention as defined in the following claims.

What I claim is:

1. A circuit for generating a reliable cooked clock signal from a raw clock signal comprising:
   a series of flip-flops with the output of each flip-flop connected to the input of the next flip-flop in the series and each flip-flop having its output initially set to the same state of one of two states and each flip-flop having an input for receiving the raw clock signal;
   a signal source for placing an input signal on the input to the first flip-flop to change the state of the flip-flop when the input signal is clocked through the flip-flop by the raw clock signal;
   a logic circuit having two inputs, one for receiving the raw clock signal and the other coupled to the output of the last flip-flop, for enabling an output clock signal when the output of the last flip-flop changes state.

2. The circuit of claim 1 wherein the flip-flops have true and complimentary outputs and the logic circuit is coupled to the complimentary output of the last flip-flop.

3. The circuit of claim 1 wherein there are two flip-flops.

4. The circuit of claim 1 wherein there are three flip-flops.

5. The circuit of claim 1 wherein the logic circuit is an OR gate.

6. The circuit of claim 1 further comprising a logic gate having a signal input to receive a master clock signal and an enable input to receive an enable signal which asynchronously enables said logic gate to output the raw clock signal.

7. A method for generating a reliable output clock signal with a series of flip-flops each with an input and an output and with the output of each flip-flop connected to the input of the next flip-flop in the series and with the output of the last flip-flop coupled to a logic circuit, the method comprising:

setting each flip-flop in the same state of one of two states as an initial condition of each flip-flop;

inputting a signal to the input of the first flip-flop that is of a state opposite to its initial condition;

inputting a raw clock signal to each of the flip-flops and to the logic circuit;

and enabling the generation of the output clock signal when the state of the last flip-flop changes.

8. The method of claim 7 further comprising the step of initially clearing the flip-flops to have a zero true output and a one complimentary output.

9. The method of claim 7 wherein the output of the last flip-flop changes state on the rising edge of the raw clock signal.

10. The method of claim 7 wherein the output clock signal begins with a falling clock pulse.

11. The method of claim 7 wherein the logic circuit is an OR gate.

12. The method of claim 7 wherein the series of flip-flops includes two flip-flops.

13. The method of claim 7 wherein the series of flip-flops includes three flip-flops.

14. The circuit of claim 1 wherein the flip-flops are formed with CMOS transistors.

15. The circuit of claim 1 wherein the flip-flops are formed using transmission gates.

16. The method of claim 7 wherein the flip-flops are formed with CMOS transistors.

17. The method of claim 7 wherein the flip-flops are formed with transmission gates.

18. The method of claim 7 further comprising the step of initially setting the flip-flops to their zero state.

19. The method of claim 7 further comprising the step of gating a master clock signal through a logic gate with an asynchronous enable signal to generate the raw clock signal.

20. A computer system comprising:

a microprocessor for accessing one or more peripheral components in accordance with addresses generated by said microprocessor and a master clock signal from a clock for synchronizing operations of the microprocessor and the peripherals components;

an interface component disposed between the microprocessor and the peripheral component(s), receiving addresses generated by said microprocessor and the master clock signal;

means for selectively coupling the master clock signal into the peripheral; said selective coupling means comprising a circuit having;

a series of flip-flops with the output of each flip-flop connected to the input of the next flip-flop in the series and each flip-flop having its output initially set to the same state of one of two states;

a signal source for placing an input signal on the input to the first flip-flop to change the state of the flip-flop when the input signal is clocked through the flip-flop with a raw clock signal;

means for coupling the raw clock signal to each flip-flop;

a logic circuit having two inputs, one coupled to the raw clock signal and the other coupled to the output of the last flip-flop, for enabling an output clock signal when the output of the last flip-flop changes state;

an input buffer that receives the master clock signal and can selectively gate the master clock signal through said input buffer to create the raw clock signal for the series of flip flops and the logic circuit described above.

21. The invention of claim 20 wherein the flip-flops have true and complimentary outputs and the logic circuit is coupled to the complimentary output of the last flip-flop.

22. The invention of claim 20 wherein there are two flip-flops.

23. The invention of claim 20 wherein there are three flip-flops.

24. The invention of claim 20 wherein the logic circuit is an OR gate.

25. The invention of claim 20 wherein the input signal to the first flip-flop is statically tied to a logic one or zero.

26. The invention of claim 20 wherein the input buffer is enabled asynchronously with an enable signal.

* * * * *